United States Patent
Dai et al.

(10) Patent No.: US 12,037,759 B2
(45) Date of Patent: Jul. 16, 2024

(54) INTEGRATED ANCHORING STRUCTURE OF BASALT FIBER REINFORCED PLASTIC BARS FOR RESERVOIR BANK SLOPE AND MONITORING SYSTEM THEREOF

(71) Applicant: Wuhan Center, China Geological Survey (Central South China Innovation Center for Geosciences), Wuhan (CN)

(72) Inventors: Zhenwei Dai, Wuhan (CN); Shengtao Zhou, Wuhan (CN); Yanjun Zhang, Wuhan (CN); Xiaolin Fu, Wuhan (CN); Runqing Ye, Wuhan (CN); Jinjun Guo, Wuhan (CN); Zhigang Du, Wuhan (CN)

(73) Assignee: Wuhan Center, China Geological Survey (Central South China Innovation Center for Geosciences), Wuhan (CN)

( * ) Notice: Subject to any disclaimer, the term of this patent is extended or adjusted under 35 U.S.C. 154(b) by 394 days.

(21) Appl. No.: 17/520,736

(22) Filed: Nov. 8, 2021

(65) Prior Publication Data
US 2023/0025436 A1 Jan. 26, 2023

(30) Foreign Application Priority Data
Jul. 26, 2021 (CN) .......................... 202110845376.2

(51) Int. Cl.
*E02B 3/04* (2006.01)
*G01H 9/00* (2006.01)
(Continued)

(52) U.S. Cl.
CPC ............... *E02B 3/04* (2013.01); *G01H 9/004* (2013.01); *G01K 11/3206* (2013.01);
(Continued)

(58) Field of Classification Search
CPC ........... E02B 3/04; E02D 17/207; E02D 5/80; G01L 1/246; G01H 9/004; G01K 11/3206
See application file for complete search history.

(56) References Cited

U.S. PATENT DOCUMENTS 10,486,330 B2 11/2019 Giles
10,688,683 B2 6/2020 Giles
(Continued)

FOREIGN PATENT DOCUMENTS

CN 109872508 * 6/2019
CN 111945724 * 11/2020
DE 4243878 * 5/1996

*Primary Examiner* — Sean D Andrish
(74) *Attorney, Agent, or Firm* — True Shepherd LLC; Andrew C. Cheng

(57) ABSTRACT

An integrated anchoring structure of basalt fiber reinforced plastic (BFRP) bars for a reservoir bank slope includes: a plurality of BFRP anchoring bars, where each of the BFRP anchoring bars includes a plurality of BFRP bars bonded to one another, a lower steel casing pipe, an upper steel casing pipe and a steel strand bonded to an upper portion of the upper steel casing pipe and aligned with the BFRP bars, and a grating array temperature sensing optical cable, a grating array stress sensing optical cable and a grating array vibration sensing optical cable are bonded in each of the BFRP bars; a plurality of shear-resistant bricks distributed on structural planes; a pouring base arranged at a bottom of the anchoring borehole; and an anchoring section arranged at an upper portion of the pouring base.

8 Claims, 6 Drawing Sheets

(51) Int. Cl.
 *G01K 11/3206* (2021.01)
 *G01L 1/24* (2006.01)
 *E02D 17/20* (2006.01)

(52) U.S. Cl.
 CPC ............ *G01L 1/246* (2013.01); *E02D 17/207* (2013.01); *E02D 2300/0051* (2013.01); *E02D 2600/10* (2013.01)

(56) References Cited

U.S. PATENT DOCUMENTS

| | | | |
|---|---|---|---|
| 11,136,724 B2 | 10/2021 | Ye et al. | |
| 2013/0021615 A1* | 1/2013 | Duncan | G01H 9/004 356/477 |

* cited by examiner

INTEGRATED ANCHORING STRUCTURE OF BASALT FIBER REINFORCED PLASTIC BARS FOR RESERVOIR BANK SLOPE AND MONITORING SYSTEM THEREOF

CROSS-REFERENCE TO RELATED APPLICATIONS

This application claims priority to Chinese Patent Application No. 202110845376.2 with a filing date of Jul. 26, 2021. The content of the aforementioned application, including any intervening amendments thereto, is incorporated herein by reference.

TECHNICAL FIELD

The present disclosure relates to the technical field of prevention and control over reservoir bank geological disasters, and particularly relates to an integrated anchoring structure of basalt fiber reinforced plastic (BFRP) bars for a reservoir bank slope and a monitoring system thereof.

BACKGROUND

A hydro-fluctuation belt in a reservoir is usually affected by an environment feature a drying-wetting cycle. Therefore, traditional steel anchor cables are prone to corrosion when used for anchoring in reinforcement of the hydro-fluctuation belt of a canyon bank slope of the reservoir. In addition, it is difficult to monitor the health condition of an anchoring structure due to long-standing cyclical fluctuation in water level, posing a safety risk to the reservoir bank slope. Currently, a large number of novel fiber-reinforced composite anchor rods (cables) are developed and provide a new way for reinforcement of the hydro-fluctuation belt of the reservoir bank slope. The BFRP bar has a tensile strength larger than 1.1 GPa and density merely ⅓-¼ that of steel bars. Moreover, the BFRP bar has good corrosion resistance, high stability, low raw material cost, etc., thereby being an environment-friendly light material for manufacturing the anchor cable. However, with poor shear strength, the BFRP bar is prone to breakage under shear force.

Researchers currently pay more attention to the bonding effect between the BFRP bar and the concrete medium. A large-tonnage anchoring structure system capable of being practically applied to a protective structure for the hydro-fluctuation belt of the reservoir bank slope and a corresponding health monitoring system for the anchoring structure are still under development. To satisfy the anchoring requirement of the hydro-fluctuation belt of the canyon bank slope of the reservoir and improve the shear resistance of the BFRP bar anchor cable anchoring structure, it is necessary to develop a large-tonnage basalt fiber anchoring structure capable of being practically used for anchoring the hydro-fluctuation belt of the reservoir bank slope and an automatic health monitoring system for the anchoring structure.

SUMMARY

In view of this, to achieve a large-tonnage basalt fiber anchoring structure design for anchoring of a hydro-fluctuation belt of a reservoir bank slope and automatic health monitoring for an anchoring structure, the embodiments of the present disclosure provide an integrated anchoring structure of BFRP bars for a reservoir bank slope and a monitoring system thereof.

The embodiment of the present disclosure provides an integrated anchoring structure of BFRP bars for a reservoir bank slope. The integrated anchoring structure of BFRP bars for a reservoir bank slope includes:

a plurality of BFRP anchoring bars, where each of the BFRP anchoring bars includes a plurality of BFRP bars bonded to one another, a lower steel casing pipe bonded to lower ends of the BFRP bars, an upper steel casing pipe bonded to upper ends of the BFRP bars, and a steel strand bonded to upper portions of the upper steel casing pipes and aligned with the BFRP bars, and a grating array temperature sensing optical cable, a grating array stress sensing optical cable and a grating array vibration sensing optical cable are bonded in each of the BFRP bars;

a plurality of shear-resistant bricks distributed on structural surfaces of an inner wall of an anchoring borehole;

a pouring base arranged at a bottom of the anchoring borehole, where the lower steel casing pipe of each of the BFRP anchoring bars is poured in the pouring base, and the upper steel casing pipe of each of the BFRP anchoring bars is arranged in the anchoring borehole; and an anchoring section arranged on an upper portion of the pouring base, where the anchoring section includes a plurality of anchoring casing pipes allowing the BFRP anchoring bars to penetrate and a high-strength concrete pouring layer poured among the anchoring casing pipes.

Further, a shear-resistant centering support is arranged at a position, located at an elevation of each of the shear-resistant bricks, in the anchoring borehole, and a plurality of through holes allowing the BFRP anchoring bars to penetrate are provided in the shear-resistant centering supports.

Further, the shear-resistant centering supports are of disc shapes, the through holes are evenly distributed in the shear-resistant centering supports, and two ends of each of the through holes extend outwards to form a grip structure.

Further, the integrated anchoring structure of BFRP bars for a reservoir bank slope further includes an anchor ring, where an upper end of the lower steel casing pipe is inserted into the anchor ring, and the anchor ring is embedded in the upper portion of the pouring base.

Further, a plurality of centering supports arranged at intervals are arranged in the anchoring borehole in an axis direction of the anchoring borehole, and all the BFRP anchoring bars penetrate the centering supports.

Further, the integrated anchoring structure of BFRP bars for a reservoir bank slope includes an anchoring base plate arranged at an opening of the anchoring borehole, an organic clip inserted into a through hole of the anchoring base plate, an upper base plate arranged at an upper end of the organic clip, and a concrete anchor pier poured outside the anchoring base plate, where the steel strand penetrates the anchoring base plate and is poured into the concrete anchor pier, and the steel strand extends out of the concrete anchor pier.

Further, the integrated anchoring structure of BFRP bars for a reservoir bank slope further includes a full-borehole-wall imaging system, where the full-borehole-wall imaging system is used for obtaining an image in the anchoring borehole so as to determine a position of a structural plane.

Further, surfaces of portions of bonding the BFRP bar to the upper steel casing pipe and the lower steel casing pipe are subjected to sandblasting, a surface of a portion of bonding the steel strand to the upper steel casing pipe is subjected to etching or sandblasting, and internal threads are arranged on inner walls of the upper steel casing pipe and the lower steel casing pipe.

The integrated anchoring structure of BFRP bars for a reservoir bank slope has the beneficial effects that use of BFRP bar materials which are environmentally friendly, resistant to corrosion and desirable in tensile property overcomes a defect that a traditional steel anchor cable is likely to become rusty and useless during anchoring of the reservoir bank slope. Before the basalt fiber anchoring structure is mounted, firstly, a distribution position of a weak plane in an anchoring borehole is accurately determined, high-strength wall-attaching shear-resistant bricks are accurately arranged on structural planes, for example, bedding, joints and weak interlayers in the anchoring borehole to reinforce a hole wall, further, a BFRP bar with a built-in grating array temperature sensing optical cable, grating array stress sensing optical cable and grating array vibration sensing optical cable is used for anchoring a hydro-fluctuation belt of the bank slope, and all bunches of BFRP anchoring bars at corresponding elevations of all structural planes are separated by means of high-strength shear-resistant centering supports, which greatly improves shear resistance of the anchoring structure. After prestressing, the BFRP bar applies pressure stress to an anchor ring by means of a lower steel casing pipe, the anchor ring further applies pressure to high-strength concrete of an anchoring section, and the structure fully utilizes a feature that the high-strength concrete is high in compressive property, so as to greatly improve anchoring capacity of the anchoring structure.

The embodiment of the present disclosure further provides a monitoring system for the integrated anchoring structure of BFRP bars for a reservoir bank slope. The monitoring system includes a data acquisition module which is connected to all grating array temperature sensing optical cables, all grating array stress sensing optical cables and all grating array vibration sensing optical cables, and pre-stresses all BFRP anchoring bars by means of the steel strands, where the data acquisition module is configured to acquire temperature, stress and vibration of each of the prestressed BFRP bars.

Further, the data acquisition module includes a fiber grating demodulator, an automatic data acquisition system and a general packet radio service (GPRS) data transmission system, the fiber grating demodulator being connected to the grating array temperature sensing optical cable, the grating array stress sensing optical cable and the grating array vibration sensing optical cable in each of the BFRP bars, the automatic data acquisition system being connected to the fiber grating demodulator and the GPRS data transmission system, and the GPRS data transmission system being connected to a monitoring and early warning terminal for a reservoir bank slope.

The monitoring system for the integrated anchoring structure of BFRP bars for a reservoir bank slope has the following beneficial effects: a grating array sensing optical cable arranged in a BFRP bar can accurately measure temperature, stress and vibration response features in an anchoring structure within a long time range. The monitoring system can automatically monitor the anchoring structure for a long time and is an advanced anchoring structure monitoring system for the reservoir bank slope, which is green, environment-friendly, economical and reliable and has high monitoring automation.

Figure 1:
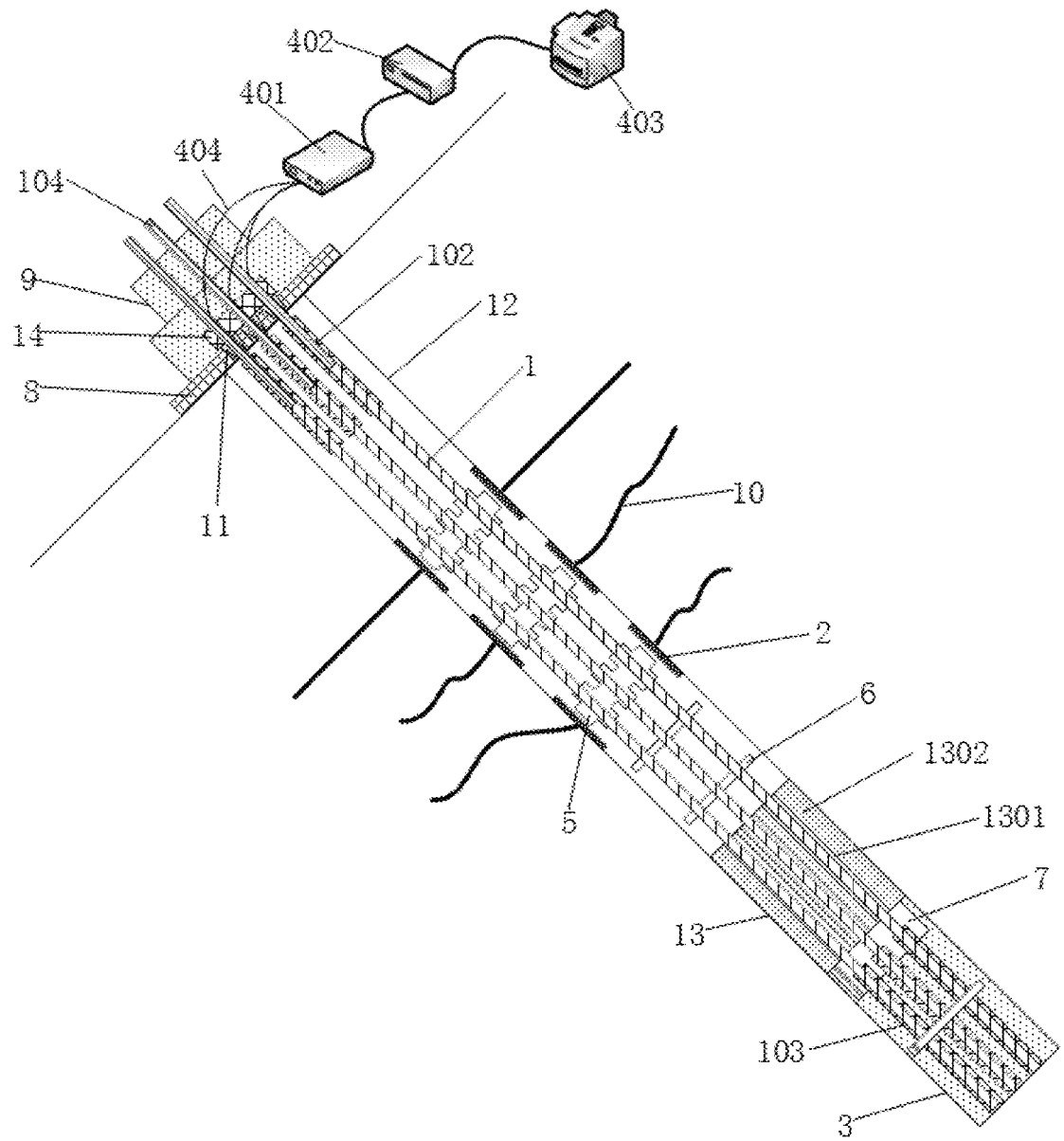
FIG. 1 is a schematic diagram of an integrated anchoring structure of BFRP bars for a reservoir bank slope and a monitoring system thereof in the present disclosure.

Reference numerals: 1—BFRP anchoring bar, 101—BFRP bar, 101a—grating array temperature sensing optical cable, 101b—grating array stress sensing optical cable, 101c—grating array vibration sensing optical cable, 102—upper steel casing pipe, 103—lower steel casing pipe, 104—steel strand, 105—steel adhesive, 2—shear represents resistant brick, 3—pouring base, 4—data acquisition module, 401—fiber grating demodulator, 402—automatic data acquisition system, 403—GPRS data transmission system, 404—FC/PC patch cable, 5—shear represents resistant centering support, 501—through hole, 502—grip structure, 503—grouting hole, 6—centering support, 601—centering hole, 602—grouting hole, 7—anchor ring, 701—anchoring hole, 702—grouting hole, 8—anchoring base plate, 9—concrete anchor pier, 10—structural plane, 11—organic clip, 12—anchoring borehole, 13—anchoring section, 1301—anchoring casing pipe, 1302—high represents strength concrete layer, and 14—upper base plate.

DETAILED DESCRIPTION OF THE EMBODIMENTS

In order to make the objectives, technical solutions and advantages of the present disclosure clearer, the implementations of the present disclosure are described in more detail below with reference to the accompanying drawings.

With reference FIG. 1, the embodiment of the present disclosure provides an integrated anchoring structure of BFRP bars for a reservoir bank slope and a monitoring system thereof.

The embodiment of the present disclosure provides an integrated anchoring structure of BFRP bars for a reservoir bank slope. The integrated anchoring structure of BFRP bars for a reservoir bank slope includes a plurality of BFRP anchoring bars 1, a plurality of shear-resistant bricks 2, a pouring base 3 and an anchoring section 13.

Figure 2:
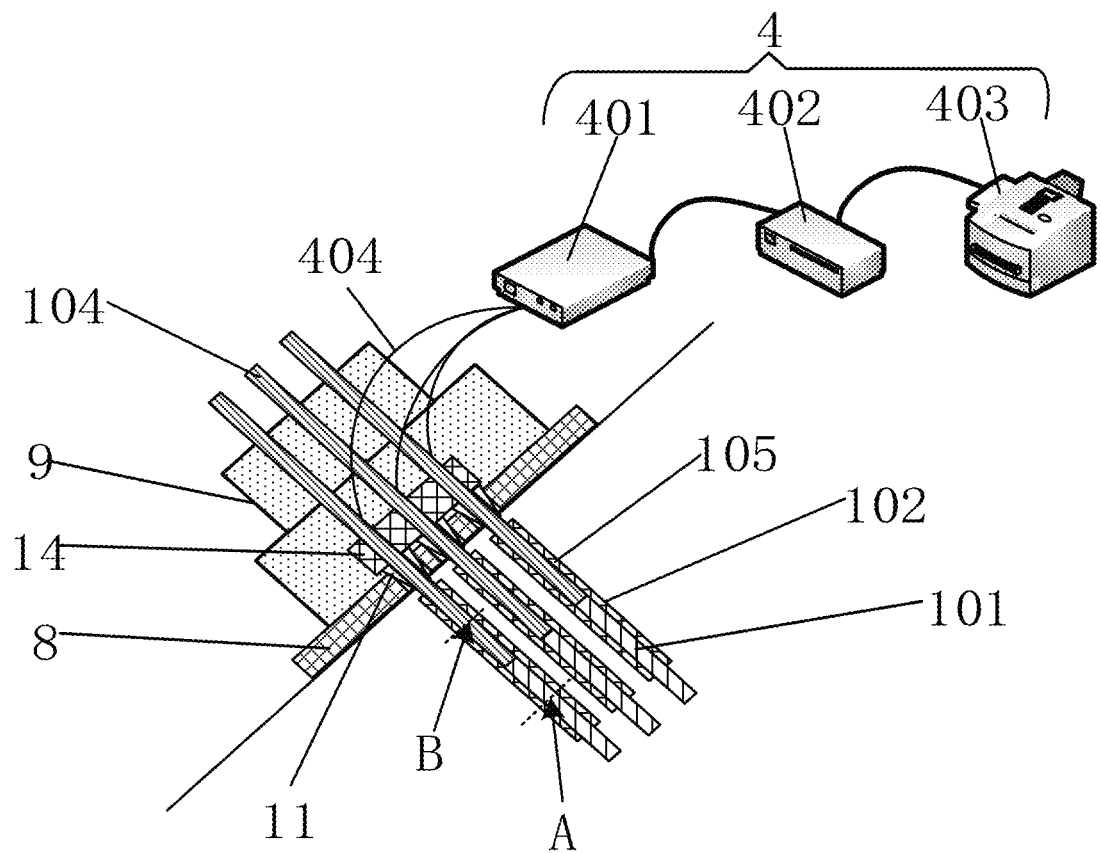
FIG. 2 is a schematic diagram of an anchoring structure of a BFRP anchoring bar at an opening of an anchoring borehole in FIG. 1.
Figure 4:
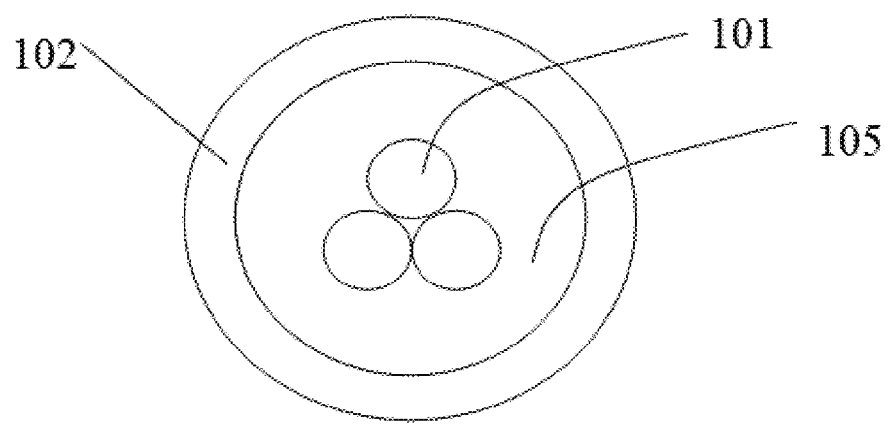
FIG. 4 is a schematic sectional view of A in FIG. 2.
Figure 5:
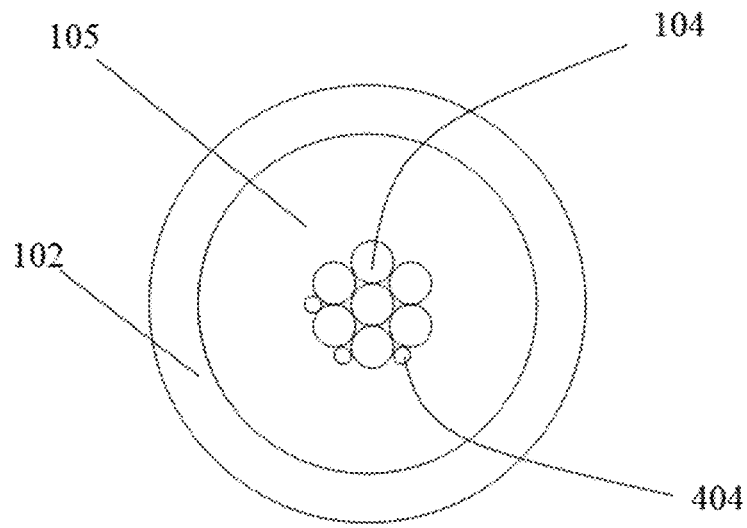
FIG. 5 is a schematic sectional view of B in FIG. 2.

Specifically, with reference to FIGS. 2, 4 and 5, the BFRP anchoring bar 1 mainly consists of a plurality of BFRP bars 101, a lower steel casing pipe 103, an upper steel casing pipe 102 and a steel strand 104. The BFRP bars 101 are bonded to one another to form a bundle, then lower ends of the BFRP bars 101 are inserted into the lower steel casing pipe 103 to be bonded and connected by means of steel adhesive 105, and upper ends of the BFRP bars 101 are inserted into the upper steel casing pipe 102 to be bonded and connected by means of the steel adhesive 105. Moreover, the steel strand 104 is inserted into an upper end of the upper steel casing pipe 102 to be aligned with the bundled BFRP bars 101, and then is bonded and fixed by means of the steel adhesive 105. The steel strand 104 and each of the BFRP bars 101 occupy ½ of the upper steel casing pipe 102 individually.

Preferably, surfaces of portions of bonding the BFRP bar 101 to the upper steel casing pipe 102 and the lower steel casing pipe 103 are subjected to sandblasting, a surface of a portion of bonding the steel strand 104 to the upper steel casing pipe 102 is subjected to etching or sandblasting, and internal threads are arranged on inner walls of the upper steel casing pipe 102 and the lower steel casing pipe 103, so as to increase friction to guarantee strength of the connection portions.

Figure 3:
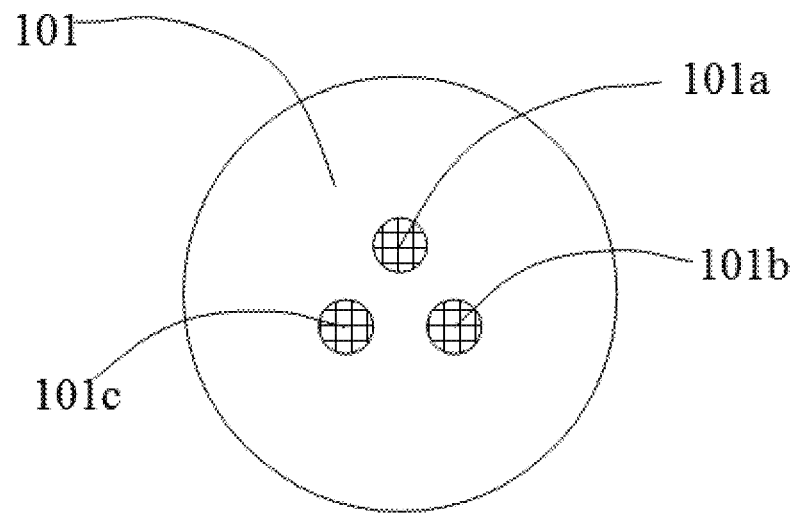
FIG. 3 is a schematic sectional view of a single BFRP bar.

With reference to FIG. 3, a grating array temperature sensing optical cable 101a, a grating array stress sensing optical cable 101b and a grating array vibration sensing optical cable 101c are bonded into each of the BFRP bars 101. The three optical cables are bonded to the BFRP bars 101 to form a whole by means of an organic material, so as to form the complete BFRP bar 101.

The shear-resistant bricks 2 are distributed at development positions of structural planes 10, for example, bedding, joints and weak interlayers, of an inner wall of an anchoring borehole 12, and are specifically arranged at intervals in a height direction of the anchoring borehole 12. The shear-resistant brick 2 is made of a high-strength organic material, and an arc length of a wall-attaching surface and a wall-attaching height of the shear-resistant brick 2 may be determined according to a width and a height, cut by the structural plane 10, for example, the bedding, the joint and the weak interlayer, of the anchoring borehole 12.

A method for distributing the shear-resistant brick 2 on the inner wall of the anchoring borehole 12 in a wall-attached mode includes: before mounting, an outer surface of the shear-resistant brick 2 is coated with a layer of organic material which is identical to a shear-resistant brick production material, and when the high-strength organic material on the surface of the shear-resistant brick 2 is not set, the shear-resistant brick 2 is lowered into the anchoring borehole 12 in a suspended mode at the development position of the structural plane 10, for example, the bedding, the joint and the weak interlayer corresponding thereto, of the anchoring borehole 12, and the non-set material on an outer side of the shear-resistant brick 2 faces the structural plane 10, for example, the bedding, the joint and the weak interlayer, of the anchoring borehole 12. Subsequently, a packer is lowered into the anchoring borehole 12, a rubber cylinder of the packer and the shear-resistant brick 2 are located at the same elevation, the rubber cylinder of the packer is controlled to expand, to attach the shear-resistant brick 2 tightly to a wall of the anchoring borehole 12, after the shear-resistant brick 2 is tightly bonded to the wall of the anchoring borehole 12, the rubber cylinder of the packer is controlled to contract, and then the packer is taken out, so the distribution of the shear-resistant brick 2 is completed. The steps are repeated to complete the distribution of all the shear-resistant bricks 2.

For accurately determining distribution positions of weak planes in the anchoring borehole 12, that is, development elevations and orientations of the structural planes 10, for example, the bedding, the joint and the weak interlayer, of the inner wall of the anchoring borehole 12, the integrated anchoring structure of BFRP bars for a reservoir bank slope is further provided with a full-borehole-wall imaging system. A 360° hole wall image of the anchoring borehole 12 is obtained by means of the full-borehole-wall imaging system, and then the development position of the structural plane 10, for example, the bedding, the joint and the weak interlayer may be determined, so as to accurately arrange the high-strength wall-attaching shear-resistant brick 2 at the development position of the structural plane 10, for example, the bedding, the joint and the weak interlayer, in the anchoring borehole 12 to reinforce the hole wall, thereby preventing the BFRP anchoring bar 101 from bearing large shear force.

Figure 6:
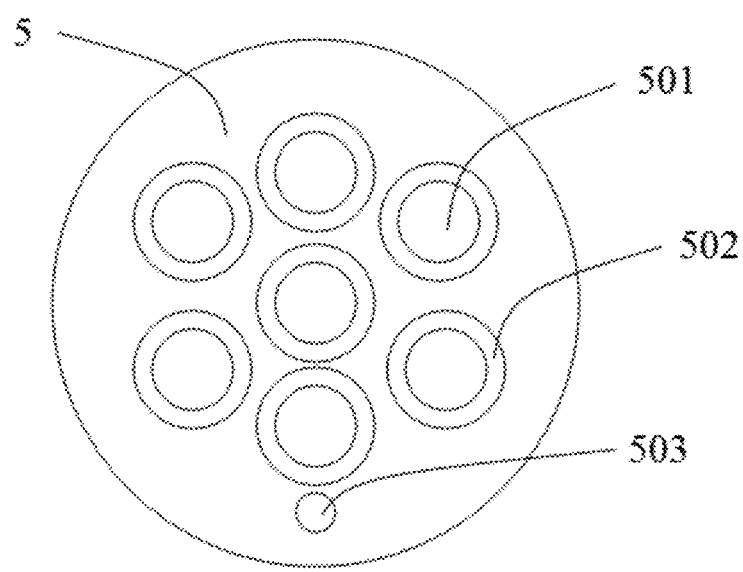
FIG. 6 is a schematic sectional view of a shear-resistant centering support 5 of FIG. 1.

Further, with reference to FIGS. 1 and 6, a shear-resistant centering support 5 is arranged at a position, located at an elevation of each of the shear-resistant bricks 2, in the anchoring borehole 12, and a plurality of through holes 501 allowing the BFRP anchoring bars 1 to penetrate are provided in the shear-resistant centering supports 5. One shear-resistant centering support 5 is arranged at the elevation of each of the shear-resistant bricks 2, the shear-resistant centering supports 5 are of disc shapes and made of an organic material with strong shear-resistant capacity, the through holes 501 are evenly distributed in the shear-resistant centering supports 5, and two ends of each of the through holes 501 extend outwards to form a grip structure 502. The plurality of BFRP bars 101 of each of the BFRP anchoring bars 1 penetrate the same through hole 501 of the shear-resistant centering support 5 so as to be limited in the same through hole 501, thereby preventing the BFRP anchoring bars 1 from being intertwined when lowered into the anchoring borehole 12.

Figure 7:
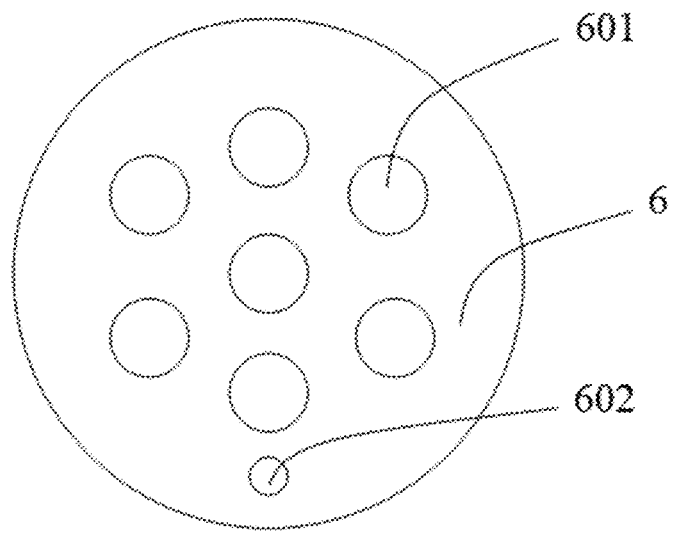
FIG. 7 is a schematic sectional view of a centering support 6 of FIG. 1.

Moreover, with reference to FIGS. 1 and 7, a plurality of centering supports 6 arranged at intervals are arranged in the anchoring borehole 12 in an axis direction of the anchoring borehole 12, each of the centering supports 6 is arranged on a portion, located outside the structural plane 10, for example, the bedding, the joint and the weak interlayer, of the anchoring borehole 12, the centering support 6 is also of a disc shape, a plurality of centering holes 601 are provided in the centering support 6, and the BFRP anchoring bars 1 penetrate the centering holes 601 in the centering support 6 separately, so as to prevent the BFRP anchoring bars 1 from being intertwined.

The pouring base 3 is arranged at a bottom of the anchoring borehole 12, the lower steel casing pipe 103 of each of the BFRP anchoring bars 1 is poured in the pouring base 3, moreover, the BFRP anchoring bars 1 penetrate an anchor ring 7, and a lower portion of the anchor ring 7 is connected to an upper end of the lower steel casing pipe 103 in an insertion mode. The pouring base 3 is poured by means of concrete in advance. A concrete pouring method includes: firstly, solid cylindrical cast iron is lowered to the bottom of the anchoring borehole 12, a diameter of the cylindrical cast iron is kept consistent with that of the anchor ring 7, a height of the cylindrical cast iron is equal to a distance between a designed position of an upper surface of the anchor ring 7 and the bottom face of the anchoring borehole 12, the anchoring borehole 12 is grouted until a height of a grouting face is consistent with an upper end face of the cylindrical cast iron, and the cylindrical cast iron is taken out after grouting slurry reaches an initial setting state.

Figure 8:
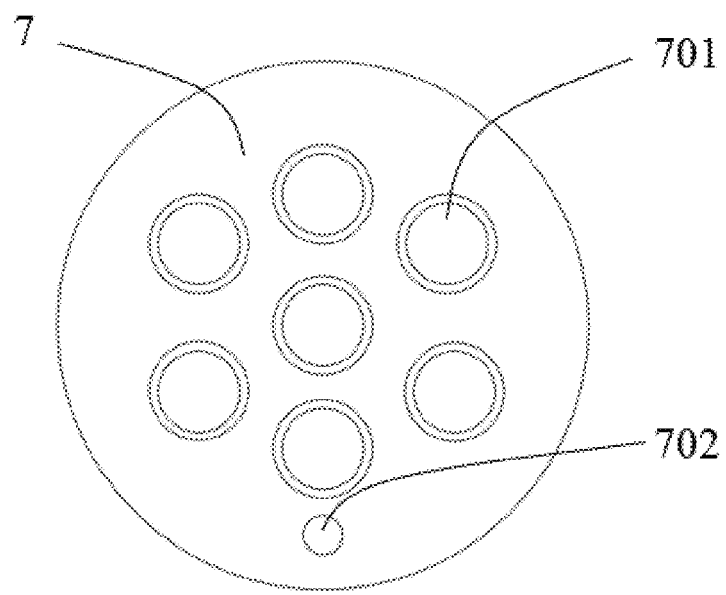
FIG. 8 is a schematic sectional view of an anchor ring 7 of FIG. 1.

With reference to FIGS. 1 and 8, the anchor ring 7 is of a disc shape, a plurality of anchoring holes 701 are provided therein, the upper ends of the lower steel casing pipes 103 are inserted into the anchoring holes 701 of the anchor ring 7 separately, the anchoring holes 701 are stepped holes, and the BFRP anchoring bars 1 penetrate the anchoring holes 701. Then the anchor ring 7 is embedded into an upper portion of the pouring base 3, the lower steel casing pipes 103 are arranged in the pouring base 3, then concrete pouring is conducted in the pouring base 3, and the lower steel casing pipes 103 are fixed after the concrete is set. Grouting holes 702, 602, 503 are provided in the anchor ring 7, the centering support 6 and the shear-resistant centering support 5 respectively so as to perform grouting pouring in the pouring base 3.

In addition, the upper steel casing pipe 102 of each of the BFRP anchoring bars 1 is arranged in the anchoring borehole 12. Specifically, an anchoring base plate 8, an organic clip 11 inserted into a through hole of the anchoring base plate 8, an upper base plate 14 arranged at an upper end of the organic clip and a concrete anchor pier 9 poured outside the anchoring base plate 8 are arranged at an opening of the anchoring borehole 12, the organic clip 11 is of a cone structure, each of the steel strands 104 penetrates the organic clip 11 and is poured into the concrete anchor pier 9, and each of the steel strands 104 extends out of the concrete anchor pier 9. A portion, beyond the concrete anchor pier 9, of the steel strand 104 is cut off after the BFRP anchoring bar 1 is prestressed, lateral pressure generated by prestressing is directly applied to the steel strand 104, and accordingly, the BFRP anchoring bar 101 is prevented from being bitten by the organic clip 11 during prestressing.

Figure 9:
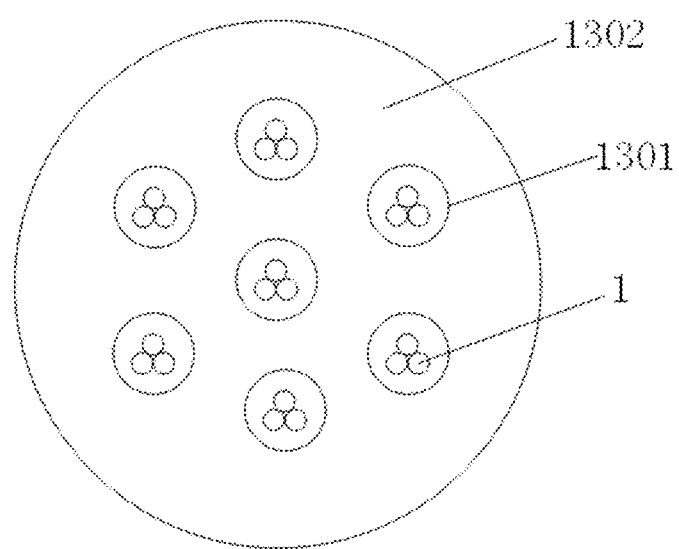
FIG. 9 is a schematic sectional view of an anchoring section 13 of FIG. 1.

With reference to FIGS. 1 and 9, the anchoring section 13 includes a plurality of anchoring casing pipes 1301 allowing the BFRP anchoring bars 1 to penetrate and a high-strength concrete pouring layer 1302 among the anchoring casing pipes 1301. The anchoring casing pipe may be a hollow polyvinyl chloride (PVC) casing pipe or a basalt fiber casing pipe, the BFRP anchoring bar 1 is arranged in the anchoring casing pipe 1301 in the anchoring section 13, and the BFRP anchoring bar 1 and the anchoring casing pipe 1301 are not bonded, so the problem of deformation incoordination between the BFRP anchoring bar 1 and the high-strength concrete layer 1302 in the anchoring section may be effectively avoided. After prestressing, tensile stress borne by the anchoring structure may be converted into compressive stress borne by the high-strength concrete layer 1302 of the anchoring section 13 by means of the anchor ring 7, so the tensile capacity of the BFRP anchoring bar 1 and the compressive performance of the high-strength concrete layer 1302 may be exerted to a maximum extent, which greatly improves the anchoring performance of the anchoring structure. Moreover, the arrangement of the anchoring casing pipe 1301 may prevent the BFRP anchoring bars 1 from being intertwined.

The embodiment of the present disclosure further provides a monitoring system for the integrated anchoring structure of BFRP bars for a reservoir bank slope. The monitoring system includes a data acquisition module 4, where the data acquisition module 4 is configured to acquire temperature, stress and vibration of each of the prestressed BFRP bars 101. Specifically, the data acquisition module 4 includes a fiber grating demodulator 401, an automatic data acquisition system 402 and a general packet radio service (GPRS) data transmission system 403, the fiber grating demodulator 401 being connected to the grating array temperature sensing optical cable 101a, the grating array stress sensing optical cable 101b and the grating array vibration sensing optical cable 101c in each of the BFRP bars 101 by means of a fixed connection (FC)/physical contact (PC) patch cable 404, the automatic data acquisition system 402 being connected to the fiber grating demodulator 401 and the GPRS data transmission system 403, and the GPRS data transmission system 403 being connected to a monitoring and early warning terminal for a reservoir bank slope so as to transmit the temperature, stress and vibration of each of the BFRP bars 101 to the monitoring and early warning terminal for a reservoir bank slope.

When the integrated anchoring structure of BFRP bars for a reservoir bank slope and the monitoring system therefor are mounted and distributed, elevations and orientations of all structural planes 10, for example, bedding, joints and weak interlayers, in an anchoring borehole 12 are firstly determined, shear-resistant bricks 2 are distributed at corresponding positions, and then a pouring base 3 is poured at a bottom of the anchoring borehole 12. Then the BFRP anchoring bar 1, the shear-resistant centering support 5, the centering support 6, the anchoring casing pipe 1301 and the anchor ring 7 are assembled and lowered into the anchoring borehole 12, a lower steel casing pipe 103 at a bottom of the BFRP anchoring bar 1 is put into the pouring base 3, then grouting pouring is performed in the pouring base 3, and an interior of the pouring base 3 and the pouring base 3 are poured to form a complete cylinder. After initial setting of concrete in the pouring base 3 is completed, high-strength concrete is used for being poured in gaps among the anchoring casing pipes 1301, the concrete is set to form a high-strength concrete layer 1302, and the anchoring section 13 is formed. Then an anchoring base plate 8, an organic clip 11 and an upper base plate 14 are arranged at an opening of the anchoring borehole 12, and then each of the BFRP anchoring bars 1 is prestressed. Specifically, a small cross-core jack is used for tensioning steel strands 104 of single bundles of BFRP anchoring bars 1 one by one, and after being tensioned to 50% of target prestress, a large cross-core jack is used for integrally tensioning all steel strands 104 of the basalt fiber anchoring structure to complete prestress application. After the prestress is applied, the remaining steel strand 104 is cut off, the concrete is poured to form a concrete anchor pier 9, and anchoring of the basalt fiber anchoring structure is completed.

Finally, all grating array temperature sensing optical cables 101a, all grating array stress sensing optical cables 101b and all grating array vibration sensing optical cables 101c are connected to a data acquisition module 4 by means of an FC/PC patch cable 404 for data acquisition, and temperature, stress and vibration states of the basalt fiber anchoring structure are automatically transmitted to a monitoring and early warning command center in real time, thereby achieving automatic health monitoring of the basalt fiber anchoring structure.

Herein, the involved terms including front, rear, upper, lower, etc., are defined in terms of the positions of parts and between the parts in the drawings, just for clarity and convenience of expressing the technical solution. It should be understood that the use of such parties should not limit the scope of protection of the claimed application.

The above embodiments and the features of the embodiments herein may be combined with each other without conflict.

The above-mentioned are merely preferred embodiments of the present disclosure, and are not intended to limit the present disclosure. Any modifications, equivalent replacements and improvements made within the spirit and principle of the present disclosure should fall within the protection scope of the present disclosure.

What is claimed is:

1. An integrated anchoring structure of basalt fiber reinforced plastic (BFRP) bars for a reservoir bank slope, comprising:
   a plurality of BFRP anchoring bars, wherein each of the BFRP anchoring bars comprises a plurality of BFRP bars bonded to one another, a lower steel casing pipe bonded to lower ends of the BFRP bars, an upper steel casing pipe bonded to upper ends of the BFRP bars, and a steel strand bonded to an upper portion of the upper steel casing pipe and aligned with the BFRP bars, and a grating array temperature sensing optical cable, a grating array stress sensing optical cable and a grating array vibration sensing optical cable are bonded in each of the BFRP bars;

a plurality of shear-resistant bricks distributed on structural surfaces of an inner wall of an anchoring borehole;

a pouring base arranged at a bottom of the anchoring borehole, wherein the lower steel casing pipe of each of the BFRP anchoring bars is poured in the pouring base, and the upper steel casing pipe of each of the BFRP anchoring bars is arranged in the anchoring borehole; and an anchoring section arranged on an upper portion of the pouring base, wherein the anchoring section comprises a plurality of anchoring casing pipes and a high-strength concrete pouring layer poured among the anchoring casing pipes; the BFRP anchoring bars are capable of penetrating the plurality of anchoring casing pipes.

2. The integrated anchoring structure according to claim 1, wherein a shear-resistant centering support is arranged at a position, located at an elevation of each of the shear-resistant bricks, in the anchoring borehole, and a plurality of through holes are provided in the shear-resistant centering supports; the BFRP anchoring bars are capable of penetrating the plurality of through holes.

3. The integrated anchoring structure according to claim 2, wherein the shear-resistant centering supports are of disc shapes, the through holes are evenly distributed in the shear-resistant centering supports, and two ends of each of the through holes extend outwards to form a grip structure.

4. The integrated anchoring structure according to claim 1, further comprising an anchor ring, wherein an upper end of the lower steel casing pipe is inserted into the anchor ring, and the anchor ring is embedded in the upper portion of the pouring base.

5. The integrated anchoring structure according to claim 1, wherein a plurality of centering supports arranged at intervals are arranged in the anchoring borehole in an axis direction of the anchoring borehole, and all the BFRP anchoring bars penetrate the centering supports.

6. The integrated anchoring structure according to claim 1, comprising an anchoring base plate arranged at an opening of the anchoring borehole, an organic clip inserted into a through hole of the anchoring base plate, an upper base plate arranged at an upper end of the organic clip, and a concrete anchor pier poured outside the anchoring base plate, wherein the steel strand penetrates the anchoring base plate and is poured into the concrete anchor pier, and the steel strand extends out of the concrete anchor pier.

7. The integrated anchoring structure according to claim 1, further comprising a full-borehole-wall imaging system, wherein the full-borehole-wall imaging system is used for obtaining an image in the anchoring borehole so as to determine a position of a structural plane.

8. The integrated anchoring structure according to claim 1, wherein surfaces of portions of bonding the BFRP bar to the upper steel casing pipe and the lower steel casing pipe are subjected to sandblasting, a surface of a portion of bonding the steel strand to the upper steel casing pipe is subjected to etching or sandblasting, and internal threads are arranged on inner walls of the upper steel casing pipe and the lower steel casing pipe.

\* \* \* \* \*